(12) United States Patent
Ahn

(10) Patent No.: US 6,693,679 B1
(45) Date of Patent: Feb. 17, 2004

(54) MONITOR FRONT CASE WITH GATE LANDINGS

(75) Inventor: Hae Won Ahn, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 705 days.

(21) Appl. No.: 08/892,716

(22) Filed: Jul. 15, 1997

(30) Foreign Application Priority Data

Jul. 16, 1996 (KR) .......................................... 96-21080
Jun. 5, 1997 (KR) .......................................... 97-13466

(51) Int. Cl.[7] ................................................. H04N 7/18
(52) U.S. Cl. ........................................ 348/818; 348/819
(58) Field of Search ............................. 348/818, 819, 348/820

(56) References Cited

U.S. PATENT DOCUMENTS

| | | | | |
|---|---|---|---|---|
| 4,360,838 A | * | 11/1982 | Babicz et al. ............... | 348/818 |
| 5,359,421 A | * | 10/1994 | Maeda ....................... | 348/818 |
| 5,526,064 A | * | 6/1996 | Okugawa et al. ........... | 348/818 |
| 5,565,934 A | * | 10/1996 | Boudreau et al. ........... | 348/818 |
| 5,591,385 A | * | 1/1997 | Arai et al. ................. | 264/40.6 |
| 5,674,351 A | * | 10/1997 | Lovoi ......................... | 156/629 |
| 5,806,940 A | * | 9/1998 | Heirich ....................... | 312/7.2 |

* cited by examiner

Primary Examiner—Andy Rao
(74) Attorney, Agent, or Firm—Robert E. Bushnell, Esq.

(57) ABSTRACT

A monitor front case with gate landings is disclosed. Each of the gate landings is formed on the CRT seating surface of the front case at a position around each gate flash remaining on the case due to a gate of an injection mold. Each gate landing is depressed due to a gate of an injection mold. Each gate landing is depressed to a depth suitable for fully recessing the gate flash and avoids an interference between the gate flash and a CRT. The gate landings remove a gate flash grinding process from the injection molding process of the case and allow the CRT to be brought into close contact with the CRT seating surface without forming any gap in the junction between the CRT and the CRT seating surface, thus improving both the appearance of a monitor and work efficiency while assembling the CRT with the case.

17 Claims, 4 Drawing Sheets

MONITOR FRONT CASE WITH GATE LANDINGS

CLAIM OF PRIORITY

This application makes reference to, incorporates the same herein, and claims all benefits accruing under 35 U.S.C. §119 from MONITOR FRONT CASE WITH GATE LANDINGS earlier filed in the Korean Industrial Property Office on Jul. 16 1996 and Jun. 5 1997, and there duly assigned Serial Nos. 96-21080 and 97-13466, respectively.

FIELD OF THE INVENTION

The present invention relates, in general, to a front case for monitors and, more particularly, to a monitor front case provided with gate landings, each of the landings being formed on a CRT seating surface of the case as a position around each gate flash and being depressed to a depth suitable for fully recessing the gate flash and avoiding an interference between the gate flash and a cathode ray tube thus removing a flash grinding process form the injection molding process of the case.

DESCRIPTION OF THE PRIOR ART

A housing for a CRT made by injection molding often contains gate flash protrusions on the surface. If these gate flash protrusions protrude from the seating surface where a CRT is mounted, a snug fit between the housing and the CRT will not be established. Although this problem can be eliminated by grinding back the protrusions, grinding back results in an extra step in the manufacturing process. What is needed is a solution to the above problem that does not require an extra manufacturing step.

SUMMARY OF THE INVENTION

Accordingly, it is an object to provide a monitor front case made by injection molding where the flash protrusions do not come into contact with the CRT upon assembly.

It is also an object to achieve the above without employing a flash grinding process.

In order to accomplish the above object, the present invention provides a front case for monitors, comprising a gate landing formed on a CRT seating surface of the front case at a position around each gate flash remaining on the case due to a gate of an injection mold, the gate landing being depressed to a depth suitable for fully recessing the gate flash and avoiding an interference between the gate flash and a cathode ray tube.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2b is a sectional view of the monitor case taken along line II–II' of FIG. 2a;

FIG. 4b is a sectional view of the monitor case taken along the line III–III' of FIG. 4a.

DESCRIPTION OF THE PREFERRED EMBODIMENTS

Figure 1:
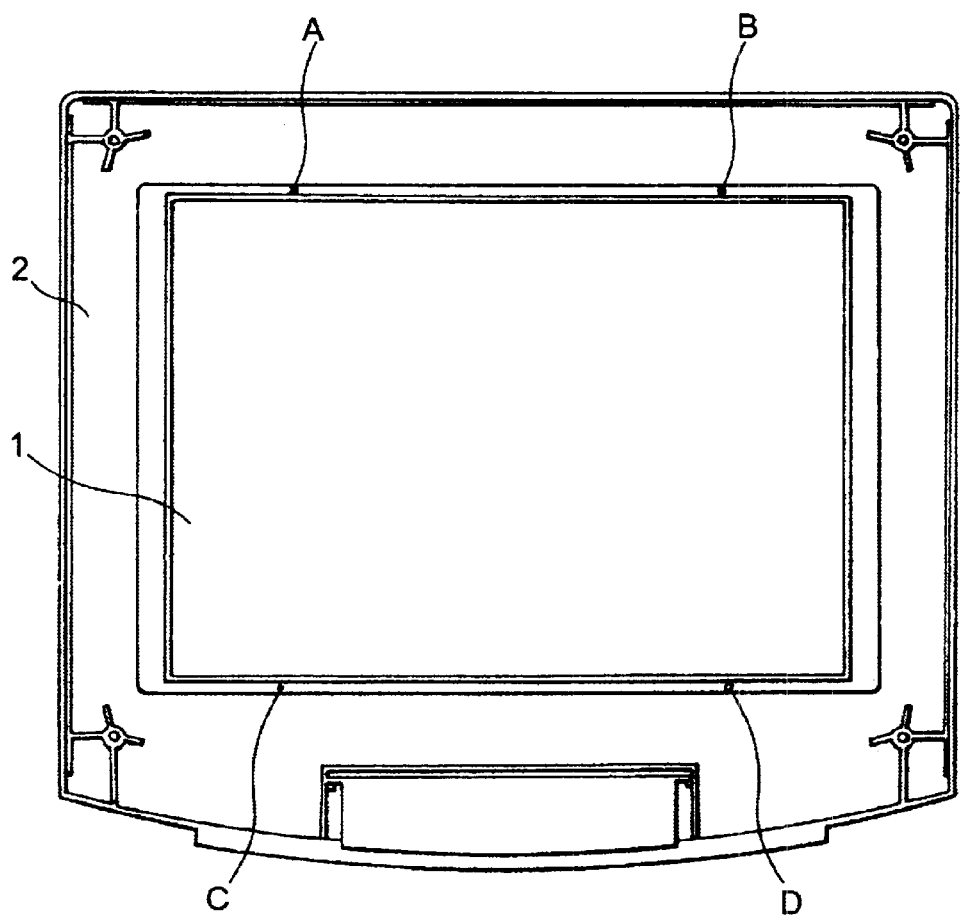
FIG. 1 is a rear view of a typical front case for monitors with a plurality of gate flashes being formed on the CRT seating surface of the case due to the gates of an injection mold.
Figure 2A:
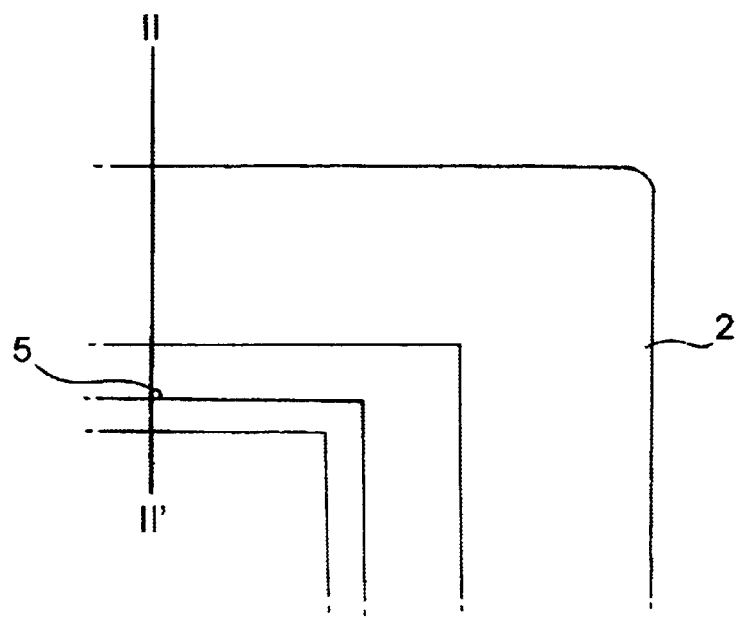
FIG. 2a show one of the gate flashes of FIG. 1 in detail.
Figure 2B:
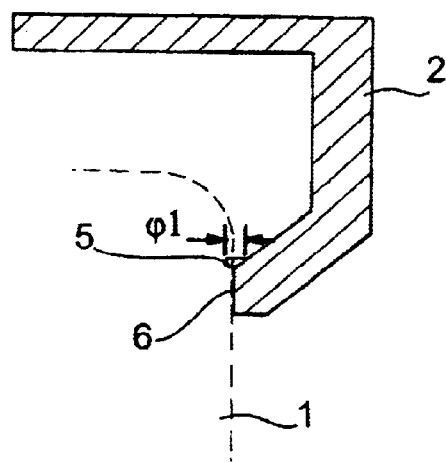

FIG. 1 is a view of a typical front case for monitors with a plurality of gate flashes being formed on the CRT seating surface of the case due to the gates of an injection mold. FIGS. 2a and 2b show one of the gate flashes of FIG. 1 in detail. As shown in the drawings, when a monitor front case is formed through an injection molding process, a plurality of, for example, four gate flashes 5 remain on the CRT seating surface 6 of the case 2 at positions A, B, C and D due to the gates of an injection mold used in the molding process.

During the injection molding process for forming the front case 2, molten resin is rejected in to the cavity of an injection mold through the gate at a predetermined running rate, the upper part of the front case 2 is formed by the resin passing through the gates placed at positions A and B, while the lower part of the case 2 is formed by the resin passing through the gates placed at positions C and D. The molten resin passing through the gates A and D gradually moves to the center of the front case 2 and meets together prior to being hardened into a designed configuration of the case 2. After the case 2 is fully hardened, the case 2 is removed from the injection mold and is assembled with a cathode ray tube (CRT) 1 into a monitor.

However, a problem experienced in the above case 2 is that a plurality of protrusions or flashes 5 remain on the CRT seating surface 6 of the case 2 at positions A to D due to the gates of the injection mold. The flashes 5, individually having a size of about ø1, interfere with the CRT 1, when the CRT is assembled with the case 2 into a monitor. The flashes 5 thus prevent the CRT 1 from coming into close contact with the CRT seating surface 6 and regrettably form a gap in the junction between the CRT 1. The above gap reduces assembling precision of the monitor and spoils the appearance of the monitor. The gap also allows foreign substances such as dust to be introduced into the monitor and stuck on a PCB (printed circuit board) inside the monitor, thus causing a bad contact of the PCB's terminals.

Figure 3:
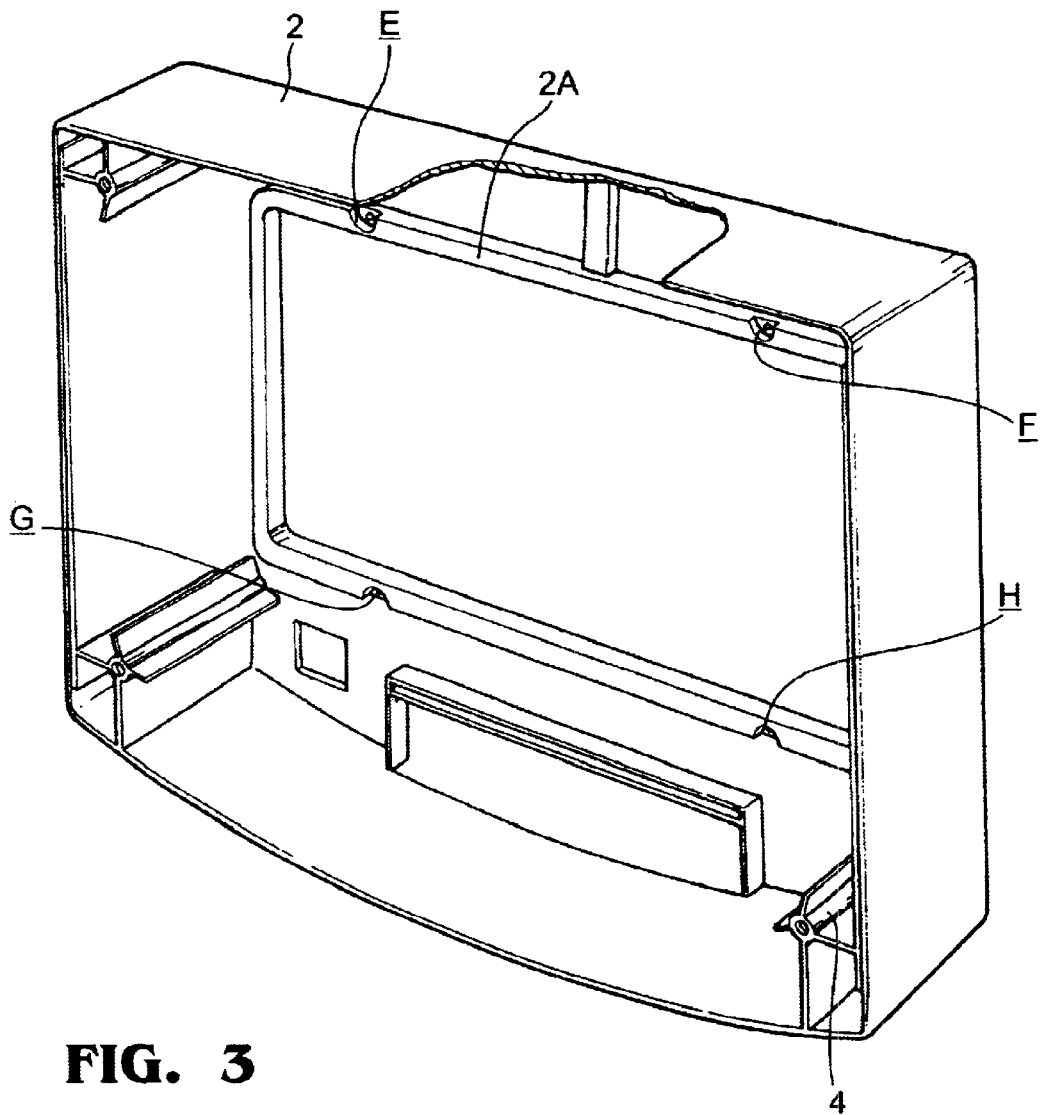
FIG. 3 is a rear perspective view of a front case with a plurality of gate landings being formed on the CRT seating surface at positions around the gate flashes in accordance with the preferred embodiment of the present invention.
Figure 4A:
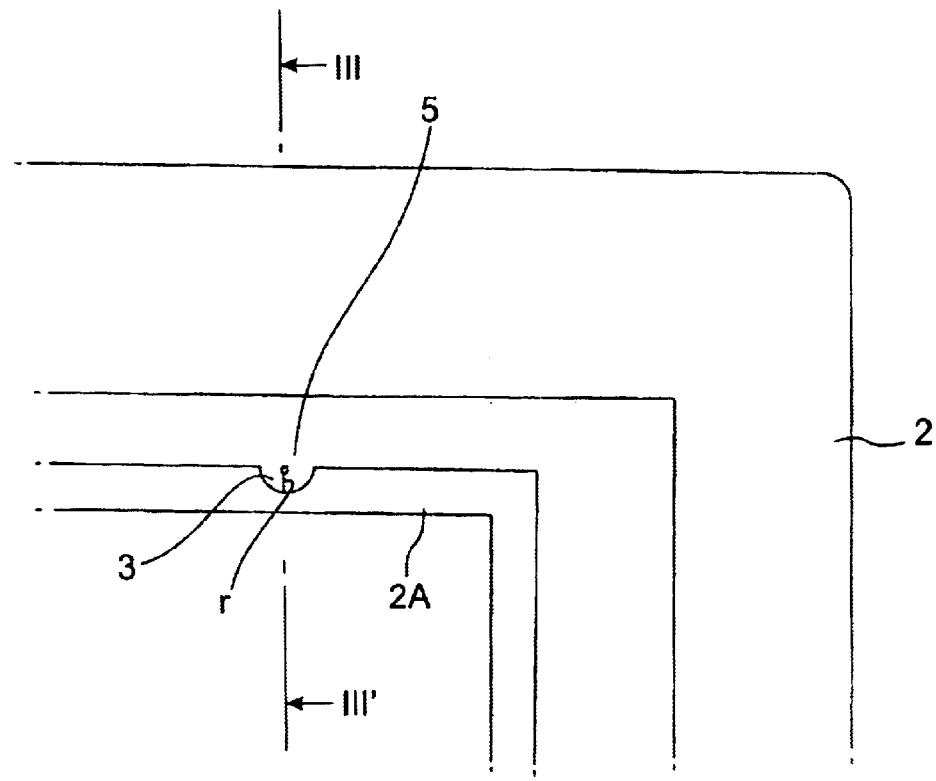
FIG. 4a is a view showing one of the gate landings of this invention in detail.
Figure 4B:
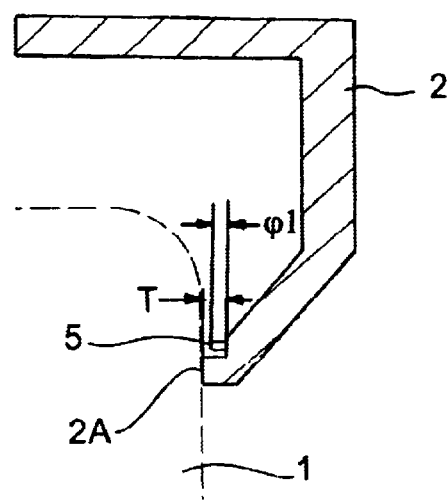

FIG. 3 shows a front case with a plurality of gate landings being formed on the CRT seating surface at positions around the gate flashes in accordance with the preferred embodiment of the present invention. FIGS. 4a and 4b show one of the gate landings of this invention in detail.

As shown in the drawings, the front case 2 of this invention has four gate landings E to H which are formed on the case 2 through an injection molding process of the case 2. The gate landings E to H are positioned on the CRT seating surface 2A of the case 2 at positions around four gate flashes 5, which remain on the case 2 due to the gates of an injection mold used in the injection molding process. The gate landings E to H are depressed on the CRT seating surface 2A, thus individually forming a semicircular depression 3 having a predetermined radius r. The gate flashes 5 are recessed in the depressions 3 respectively. Each depression 3 on the seating surface 2A preferable has a depth T of about 2.0 cm suitable for fully recessing a gate flash 5.

As shown in FIG. 3, a plurality of ribs 4 are formed on the interior wall of the front case 2 through the injection molding process of the case 2 and individually engage with an ear (not shown) of a CRT 1 when the CRT 1 is assembled with the front case 2 into a monitor.

The operational effect of the front case 2 with the gate landings E to H of this invention will be described hereinbelow. During an injection molding process for forming the front case 2, molten resin is injected into the cavity of an injection mold through the gates at a predetermined running rate, the upper part of the front case 2 is formed by the resin passing through the gates placed at positions E and F, while the lower part of the case 2 is formed by the resin passing through the gates placed at positions G and H. The molten resin passing through the gates placed at positions G and H. The molten resin passing through the gates gradually moves to the center of the front case 2 and meets together prior to being hardened into a designed configuration of the case 2. After the case 2 is fully hardened, the case 2 is removed from the injection mold and is assembled with a CRT 1 into a monitor.

In the present invention, the depressed gate landings E to H are formed on the CRT seating surface 2A of the front case 2 through the injection molding process of the case 2 so that the gate flashes 5 are fully recessed in the depressions 3 of the landings E to H. The case 2 with the landings E to H is thus free from the case 2.

Since the flashes 5, having a size of about ø1, is fully recessed in the depressions 3 of the gate landings E to H as described above, the CRT 1 is brought into close contact with the CRT seating surface 2A of the case 2 without forming any gap in the junction between the CRT 1 and the CRT seating surface 2A of the case 2. The gate landings E to H thus improve work efficiency while assembling the CRT 1 with front case 2 into a monitor. The gate landings E to H effectively remove a gap from the junction between the CRT 1 and the CRT seating surface 2A of the case 2, thus almost completely preventing foreign substances such as dust from being introduced into the monitor.

As described above, the present invention provides a monitor front case with depressed gate landings. The gate landings are formed on the CRT seating surface of the case and fully recess the gate flashes, which remain on the CRT seating surface of the case due to the gates of an injection mold. The case with the gate landings is thus from flash grinding process and improve work efficiency while producing the case.

Due to the gate landings fully recessing the gate flashes, the CRT is brought into close contact with the CRT seating surface of the case without forming any gap in the junction between the CRT and the CRT seating surface, thereby improving the appearance of a monitor and almost completely preventing foreign substances such as dust being introduced into the monitor.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A front case for a cathode-ray tube (CRT) monitor, said front case having an exterior surface, an interior surface, a CRT seating surface adapted to seat a CRT, and an edge located between the interior surface and the CRT seating surface, said front case comprising:

a gate landing formed on said CRT seating surface of said front case at a position around a gate flash remaining on the case due to a gate of an injection mold used in an injection molding process of the case, said gate flash located at said edge of said front case and thereby located between the CRT seating surface and the interior surface, said gate landing depressed to a depth suitable for fully recessing the gate flash and avoiding an interference between the gate flash and a cathode ray tube;

whereby uniformity of said CRT seating surface is preserved without annular rings being formed on the exterior surface of the front case and without thinning of the CRT seating surface opposite the gate landing, thereby facilitating a uniform, tight, dustproof fit of the front case against the CRT without interference by gate flashing or distortion by the gate landing.

2. A monitor assembly adapted to house a cathode ray tube (CRT), said monitor assembly comprising:

a CRT screen; and a front case for said CRT screen, said front case having an exterior surface, an interior surface, a CRT seating surface adapted to seat said CRT screen, and a plurality of edges located between the interior surface and the CRT seating surface, said front case comprising:

a plurality of recesses formed in said seating surface, said recesses located at said edges of said front case; and a plurality of gate flash protrusions, each of said protrusions formed entirely within a one of said plurality of recesses thereby allowing said seating surface to fit snugly against said CRT upon assembly of said monitor assembly, preserving uniformity of said CRT seating surface without annular rings being formed on the exterior surface of the front case and without thinning of the CRT seating surface opposite the gate landings, thereby facilitating a uniform, tight, dustproof fit of the front case against the CRT screen without interference by gate flashing or distortion by the gate landings.

3. The monitor assembly of claim 2, said front case being an injection molding article.

4. The monitor assembly of claim 2, wherein said gate flash protrusion on said front case does not make contact with said CRT.

5. The monitor assembly of claim 4, wherein said front case has not been subjected to a flash protrusion grinding process.

6. A front case made by injection molding, said front case adapted for housing a cathode ray tube (CRT) monitor, said front case comprising:

a seating surface where said front case makes contact with said CRT screen, a plurality of recesses formed in said seating surface, and a gate flash protrusion formed entirely within each of said plurality of recesses allowing said seating surface to fit snugly against said CRT upon assembly.

7. The front case for monitors of claim 1, said front case not subject to flash protrusion grinding process.

8. The front case for monitors of claim 1, said gate flash pointing towards but not making contact with said monitor.

9. The front case for monitors of claim 1, said front case being placed over said monitor in such a way as to prevent dirt and dust from entering into a space between said front case and said monitor.

10. The monitor assembly of claim 2, said gate flash protrusion in said plurality of recesses formed so as to point towards said CRT while never making contact with said CRT.

11. The monitor assembly of claim 10, said front case fitting so snugly against said CRT so as to prevent dirt and dust from entering into a space between said front case and said CRT when said front case is assembled to said CRT.

12. The front case of claim 6, said gate flash protrusion protruding towards, but never making contact with said CRT when said front case is assembled to said CRT.

13. The front case of claim 6, said front case not being subject to a flash protrusion grinding process.

14. The front case of claim 6, said front case fitting so snugly against said CRT so as to prevent dirt and dust from entering into a space between said front case and said CRT when said front case is assembled to said CRT.

15. A process for manufacturing an injection-molded front case for a cathode-ray tube (CRT) in a manner providing a more uniform, tight, dustproof fit of the front case against the CRT, said process comprising the following steps:

(1) providing a injection mold adapted for forming the front case, said mold having a cavity and gates for delivering molten resin to the cavity;

(2) injecting molten resin into the cavity via the gates;

(3) forming a front case having:
   an exterior surface;
   an interior surface;
   a CRT seating surface adapted to seat a CRT;
   an edge located between the interior surface and the CRT seating surface;
   at least one gate flash on the front case due to a gate of the injection mold, said gate flash located at said edge of said front case and thereby located between the CRT seating surface and the interior surface; and
   a gate landing on said CRT seating surface of said front case at a position around said at least one gate flash, said gate landing depressed to a depth suitable for fully recessing the gate flash and avoiding an interference between the gate flash and the CRT;

(4) allowing the front case to cool and harden in the mold; and (5) removing the front case from the mold;

whereby uniformity of said CRT seating surface is preserved without annular rings being formed on the exterior surface of the front case and without thinning of the CRT seating surface opposite the gate landing, and whereby a uniform, tight, dustproof fit of the front case against the CRT without interference by gate flashing or distortion by the gate landing is facilitated.

16. The process of claim 15 wherein said steps are not followed by a flash protrusion grinding process to grind back gate flash protrusions.

17. The process of claim 15 wherein said cooling step (4) is carried out without any provision of a moderate cooling gradient for ensuring that no difference in temperature occurs between resin in the cavity near the gate and other portions of resin in the cavity.

* * * * *